United States Patent Office 3,773,893
Patented Nov. 20, 1973

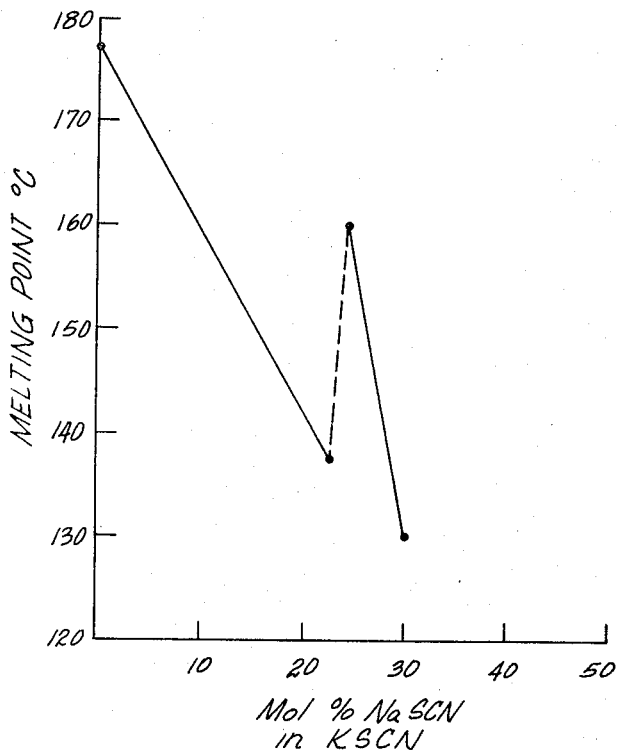
FIG_1
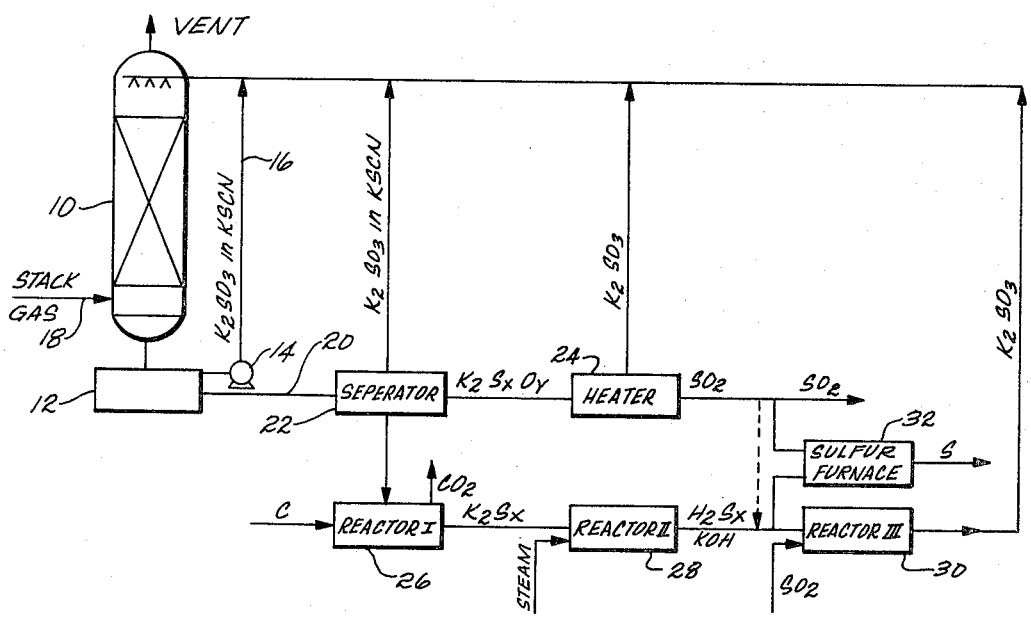
FIG_2
INVENTOR.
DOROTHY J. MANDELIN

3,773,893
PROCESS FOR REMOVING SULFUR DIOXIDE FROM GAS STREAMS USING MOLTEN THIOCYANATES
Dorothy J. Mandelin, Los Angeles, Calif., assignor to Occidental Petroleum Corporation, Los Angeles, Calif.
Filed Feb. 24, 1970, Ser. No. 13,515
Int. Cl. B01d 53/34
U.S. Cl. 423—210          17 Claims

ABSTRACT OF THE DISCLOSURE

Molten inorganic thiocyanates preferably potassium thiocyanates and mixtures of potassium and sodium thiocyanates are used as a scrubbing solvent to remove sulfur dioxide from stack gases at stack gas temperatures. Inclusion of reactive solutes in the molten thiocyanate system to convert the absorbed sulfur dioxide to other sulfur derivatives materially increases the capacity of the thiocyanate for the sulfur dioxide.

BACKGROUND OF THE INVENTION

Increasing concern over air pollution has prompted both government and industry to consider new means to remove known pollutants which are present in stack gases and flue gases being vented to the atmosphere. Sulfur dioxide is regarded as a pollutant and is commonly present in flue and stack gases emitted by many refinery operations, sulfur conversion operations, carbonaceous fuel-consuming plants and the like.

Many organic compounds such as the ethanolamines are known sulfur dioxide absorbents. They are functional, however, only at relatively low temperatures and if used at normal stack gas temperatures, considerable degradation of the absorbent may occur with possible formation of equally noxious pollutants. Accordingly, when organic absorption systems are used, the stack of flue gases must be cooled prior to contact with the absorbent or the absorbent, itself, maintained at a temperature sufficiently low to reduce the stack gases to a tolerable temperature as they pass through the absorber. In both methods, power requirements are high since power must be used to either cool the stack gases or to maintain the organic absorption system at reduced temperatures.

SUMMARY OF THE INVENTION

It has now been found that molten inorganic thiocyanate salts behave as effective solvents for the extraction of sulfur dioxide from gaseous streams. Many of the thiocyanate salts are molten at normal stack and flue gas temperatures or can be tailored by mixing salts to be molten at the temperature of the gas stream being treated. The preferred thiocyanates are the alkali thiocyanates, particularly potassium thiocyanate and mixtures of potassium thiocyanate and sodium thiocyanate.

The capacity of the molten thiocyanates for absorbing sulfur dioxide from a gaseous stream is increased by the presence of stable reactive additive solutes which chemically, or otherwise, complex the absorbed sulfur dioxide and increase, thereby, the ability of the thiocyanate solvent by various measures and the thiocyanate solvent regenerated for reuse.

DRAWINGS

FIG. 1 is an approximate melting point relationship of potassium thiocyanate and sodium thiocyanate mixtures.

FIG. 2 illustrates a regenerative system for the separation of sulfur dioxide from gases using thiocyanate absorbents.

DESCRIPTION

According to the present invention, molten inorganic thiocyanates are used as solvents for the separation of sulfur dioxide from gas stream. Inclusion in the molten thiocyanate of a temperature stable solute which is reactive with respect to sulfur dioxide increases the absorption capacity of the thiocyanate and when suitably selected forms a regenerative system. By the selection of thiocyanate or a thiocyanate mixture having a melting point equal to, or below the temperature of the processed gas stream, sulfur dioxide can be extracted without materially altering the temperature of the gas stream.

The thiocyanates which may be used for extraction of sulfur dioxide from a gas stream in accordance with the practice of this invention are those thiocyanates which are molten at temperatures at which the process gas stream can be treated. The thiocyanates in the molten state behave much like water and since many melt at fairly low temperatures (between 100° C. and 300° C.), conventional materials of construction may be employed for the absorption apparatus.

Illustrative, but no wise limiting of the inorganic thiocyanates which may be used for extraction of sulfur dioxide from a gas stream when in the molten state there may be mentioned potassium thiocyanate (M.P.=173.2° C.); sodium thiocyanate (M.P.=287° C.); ammonium thiocyanate (M.P.=149.6° C.), Strontium thiocyanate (M.P.—100° C.) and the like, as well as mixtures thereof. Potassium thiocyanate and mixtures of potassium thiocyanate and sodium thiocyanate containing up to about 30 mol percent sodium thiocyanate are preferred.

Many stack gases and flue gases emanating from post processing operations are amenable to treatment in temperatures of about 150° C. to 180° C. For such stack and flue gases, molten potassium thiocyanate is an exceptional absorbent for sulfur dioxide and absorption may be achieved without necessarily changing gas stream temperature. Gases at a lower temperature may also be effectively treated, if the heat required by the gas to raise it to the desired extraction temperature is not so great as to solidify the potassium thiocyanate during heat exchange.

Where it is desired to employ potassium thiocyanate to extract sulfur dioxide from the gas stream at lower processing temperatures, sodium thiocyanate may be added to the potassium thiocyanate to provide a solvent having a lower melting point. Alternatively, melting point may be lowered by the addition of nonfunctional solute salts at some expense to absorption capacity.

With reference now to FIG. 1, there is illustrated the approximate melting points of mixtures of impure potassium thiocyanate and sodium thiocyanate. Although sodium thiocyanate melts at higher temperatures than potassium thiocyanate when combined with potassium thiocyanate there is provided, over a range, a mixture which will melt below the melting points of both sodium thiocyanate and potassium thiocyanate. The approximate melting points for sodium thiocyanate concentration up to 30 mol percent sodium thiocyanate is shown in FIG. 1.

It will be noted that a disruption in the decrease in the melting point with increased sodium thiocyanate concentration occurs at a sodium thiocyanate concentration of about 23 mol percent. While not bound by theory, through some interaction between these thiocyanates, the melting point of the mixture suddenly increases with increased NaSCN concentrated to a high at about a concentration of about 25 mol percent, decreasing again along a new path with increased NaSCN concentration to a low of about 130° C. at a NaSCN concentration of about 30 mol percent.

As with any solvent, the thiocyanates do have a determinable capacity to dissolve sulfur dioxide. At normal stack gas temperatures, for instance, where the effective partial pressure of sulfur dioxide is approximately 2 millimeters mercury, its solubility in pure potassium thiocyanate at 180° C. is approximately $2.0 \times 10^{-6}$ mols per gram. For a mixture containing 80 mol percent potassium thiocyanate and 20 mol percent sodium thiocyanate at 150° C. the solubility is approximately $1.8 \times 10^{-6}$ mols per gram.

Accordingly, when the molten thiocyanates are used alone for scrubbing sulfur dioxide from a gas stream, fairly high flow rates per unit volume of gas should be employed to completely absorb, on a continuous or batchwise basis, the sulfur dioxide from the gas stream.

More conveniently, however, there may be included in the molten thiocyanate a temperature stable solute, present either in solution or suspension, which is reactive with respect to sulfur dioxide.

Generally, the reactive solutes may be classed as behaving as bases, oxidizing agents, or reducing agents. Solutes which behave as bases such as hydroxides, carbonates and the like, which dissolve or suspend in solution have been found to react rapidly with sulfur dioxide to form sulfites by the reaction given, for example, for potassium carbonate:

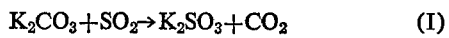
$$K_2CO_3 + SO_2 \rightarrow K_2SO_3 + CO_2 \qquad (I)$$

Potassium sulfite, in turn, complexes with additional sulfur dioxide to form the general complex $K_2S_xO_y$.

Thus, it will be readily appreciated therefore the sulfites themselves are useful reactive solutes. Independent of basic solute used, its cation is preferably the same as the cation of the thiocyanate. Where mixtures of thiocyanate are used the cations of the solutes used should also preferably be the same as the cations present in mixture of the thiocyanates.

As indicated, the basic solutes react with the sulfur dioxide to form sulfites. As indicated, the sulfites form complexes with sulfur dioxide which are only sparingly soluble in the melt and may be readily removed for sulfur recovery and regeneration of the thiocyanate solvent.

As reducing agents, there may be mentioned among others the sulfides. In the case where potassium thiocyanate is used as a scrubbing agent, an ideal reducing agent is potassium sulfide. Potassium sulfide reacts with sulfur dioxide to form a mixture of reaction products by reaction which may be generally written as:

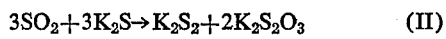
$$3SO_2 + 3K_2S \rightarrow K_2S_2 + 2K_2S_2O_3 \qquad (II)$$

Again, the cation of the sulfite should be the same or similar to the cation of the thiocyanate used to extract sulfur dioxide from the gas stream.

Sulfur dioxide may also be quantitatively oxidized to sulfur dioxide using oxidizing agents such as the quinones. Among the quinones which may be mentioned, there is included sodium 1,2-naphthoquinone-4-sulfonate. The quinones react rapidly with sulfur dioxide to form sulfur trioxide by a reaction which may be generally written as:

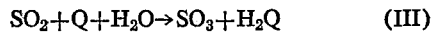
$$SO_2 + Q + H_2O \rightarrow SO_3 + H_2Q \qquad (III)$$

wherein Q represents the quinone used.

It has been observed that even the addition of a minor amount of a suitable reactive solute materially increases the capacity of thiocyanates for sulfur dioxide. The reactive solutes in reacting with the sulfur dioxide appear to form substances which do not appear to interfere in any way with continuing absorption of sulfur dioxide until the reactive solutes are consumed and the thiocyanate begins to become saturated with respect to unreacted sulfur dioxide.

The amount of reactive solute which may be included in the thiocyanate system for scrubbing sulfur dioxide from the gas stream is not narrowly critical. Generally, amounts of from about $10^{-3}$ mols or less to about $10^{-1}$ mols or more per mol molten thiocyanate are preferred.

With reference now to FIG. 2 a regenerative thiocyanate system for absorbing sulfur dioxide from gas streams may be illustrated in terms of the use of potassium thiocyanate, in which potassium sulfite serves as the reactive solute, for extraction of sulfur dioxide from stack gases. Potassium thiocyanate above its melting point behaves like water at that temperature, and may be conveniently employed in conventional gas scrubbing towers. Conveniently, the gas may be scrubbed by passing the stack gas in counter current flow to the molten potassium thiocyanate, in scrubbing tower 10, the clean gas exiting or venting at the top.

Potassium thiocyanate which is maintained in an insulated reservoir 12 at above its melting point may be conveniently pumped using insulated pump 14 in insulated line 16 to the upper level of the tower 10 where it is allowed to flow counter-current to a stack gas stream entering in line 18.

The potassium thiocyanate after contacting the stack gas is returned to reservoir 12 which contains the molten thiocyanate. The potassium sulfite-sulfur dioxide complex ($K_2S_xO_y$) which is a mixture of products, is only sparingly soluble and tends to collect at the base. Conveniently, this complex along with some of the potassium thiocyanate-solute system is removed in line 20 and passed to a separation zone 22 where the free potassium thiocyanate and potassium sulfite may be separated and recycled to tower 10.

Alternately, or concurrently, a portion of the potassium sulfite-sulfur dioxide complex may be passed to reactor 26 where it is reacted in the presence of a source of carbon, such as pulverized coal, to form carbon dioxide and a potassium sulfide which may then be passed to reactor 28 where potassium sulfide reacts in an exchange reaction with steam to form hydrogen sulfide and potassium hydroxide. The hydrogen sulfide and potassium hydroxide which is formed may then be reacted with sulfur dioxide in reactor 30 to re-form potassium sulfite for return to the system. The sulfur dioxide may be supplied from an external source or from heater 24.

Alternatively, hydrogen sulfide may be combined with sulfur dioxide released in heater 24 in sulfur furnace 32 such as a Claus-type furnace and consumed to form elemental sulfur.

This system, it will be appreciated, provides one flexible means to extract sulfur dioxide from gas streams and convert extracted sulfur dioxide to useful products. It also provides, as is evident, a regenerative system in which the potassium thiocyanate can be continuously regenerated for use in absorbing sulfur dioxide from stack gases.

While no wise limiting, the following are illustrative of the practice of the process of this invention.

Example 1

A stack gas containing 0.30 percent by volume $SO_2$, 2.78 percent by volume $O_2$, 18.28 percent by volume $CO_2$ and 78.70 percent by volume $N_2$ was bubbled through a solution containing 40 parts by weight KSCN and 0.67 part by weight $Na_2S \cdot 9H_2O$ maintained at a temperature of 180° C. Contact rate was 8 liters of stack gas per mol KSCN per hour. After 15 minutes, it was determined that essentially all of the $SO_2$ contained in gas passed through the KSCN solution was absorbed by the KSCN.

Example 2

Example 1 was repeated except that the $Na_2S \cdot 9H_2O$ was replaced by 0.8 part by weight $K_2CO_3$. Again, all of the $SO_2$ contained in the gas passed through the molten solution was absorbed.

Example 3

Example 1 was repeated except that the $Na_2S \cdot 9H_2O$ was replaced by a 0.4 part by weight sodium 1,2-naphthoquinone-4-sulfonate. Between 80 and 90 percent of the absorbed $SO_2$ was converted to $SO_3$.

Example 4

A stack gas of composition identical to that set forth in Example 1 was passed through a molten mixture containing 40 parts by weight KSCN and 10 parts by weight NaSCN maintained at a temperature of 150° C. Gas flow rate was maintained at a rate of 1.62 liters per hour until $SO_2$ was no longer absorbed. At a 90 percent total absorption of $SO_2$, 2.7 liters of gas was scrubbed per kilogram of molten solution.

Example 5

Example 4 was repeated except there was added 4 parts by weight $Na_2SO_3$ and 4 parts by weight $K_2SO_3$ to the molten thiocyanate solution. At 90 percent sulfur dioxide removal, scrubbing efficiency of the thiocyanate solution increased to 65 liters of gas per kilogram of solution.

Example 6

Following the procedure set forth in Example 4, and employing a solution 50 parts by weight KSCN and 0.2 part by weight $K_2SO_3$ maintained at 180° C., a scrubbing efficiency of 146 liters per kilogram of solution was obtained. About 64 percent of the sulfite reacted with the absorbed sulfur dioxide.

Example 7

Time absorption efficiencies of three thiocyanate solutions at a stack gas contact rate of about 32 liters of gas per kilogram molten thiocyanate per hour were determined.

Solution A was composed of 40 parts by weight KSCN and 10 parts by weight NaSCN and was maintained at 150° C.

Solution B was identical to solution A except there was included 4 parts by weight $K_2SO_3$ and 4 parts by weight $Na_2SO_3$.

Solution C contained 50 parts by weight KSCN and 0.2 part by weight $K_2SO_3$ and was maintained at 180° C.

Table 1 shows the change in percent $SO_2$ absorbed from the gas stream with time.

TABLE I

| Time (hours) | $SO_2$ absorbed, percent | | |
|---|---|---|---|
| | Solution A | Solution B | Solution C |
| 0 | 100 | 100 | 100 |
| 0.5 | 51 | 100 | 100 |
| 1.0 | | 100 | 100 |
| 1.5 | 23 | 100 | 100 |
| 2.0 | 17 | 93 | 100 |
| 2.5 | 12 | 80 | 100 |
| 3.0 | 9 | 72 | 100 |
| 3.5 | | 68 | 100 |
| 4.0 | | 60 | 96 |
| 4.5 | | 58 | 90 |
| 5.0 | | 50 | 86 |
| 5.5 | | 49 | 81 |

Example 8

Absorbing efficiency of a solution as a function of solute utilization at a constant gas flow rate was determined for two solutions.

Solution D was identical to Solution C of Example 7.

Solution E was composed of 10 parts by weight NaSCN, 40 parts by weight KSCN and 0.2 part by weight $K_2CO_3$ and was maintained at a temperature of 150° C.

The results are shown in Table II.

TABLE II

| Solute utilization, mol percent | $SO_2$ absorbed, percent | |
|---|---|---|
| | Solution A | Solution B |
| 0 | 100 | 100 |
| 5 | 100 | 100 |
| 10 | 100 | 100 |
| 15 | 100 | 100 |
| 20 | 100 | 100 |
| 25 | 100 | 95 |
| 30 | 100 | 90 |
| 35 | 100 | 87 |
| 40 | 100 | 78 |
| 45 | 100 | |
| 50 | 100 | |
| 55 | 100 | |
| 60 | 97 | |
| 65 | 90 | |
| 70 | 80 | |

Example 9

Absorption efficiencies as a function of solute utilization at a constant gas flow rate was determined for 3 KSCN solutions.

Solution F was a mixture of a technical grade potassium thiocyanate containing 0.4% by weight potassium sulfite.

Solution G was a mixture of reagent grade potassium thiocyanate containing 0.4% by weight potassium sulfite.

Solution H was a mixture of reagent grade potassium thiocyanate containing 0.2% by weight potassium sulfite.

In each instance the absorption system was maintained at 180° C. The results are shown in Table III.

TABLE III

| Sulfite uses, mol percent | $SO_2$ absorbed, percent | | |
|---|---|---|---|
| | Solution F | Solution G | Solution H |
| 0 | 100 | 100 | 100 |
| 5 | 100 | 100 | 100 |
| 10 | 100 | 100 | 100 |
| 15 | 100 | 100 | 100 |
| 20 | 100 | 100 | 100 |
| 25 | 100 | 100 | 100 |
| 30 | 100 | 100 | 100 |
| 35 | 100 | 100 | 100 |
| 40 | 100 | 100 | 100 |
| 45 | 100 | 100 | 100 |
| 50 | 100 | 100 | 100 |
| 55 | 100 | 100 | 100 |
| 60 | | 97 | 100 |
| 65 | | 91 | 99 |
| 70 | | 83 | 91 |
| 75 | | | 88 |
| 80 | | | 71 |

What is claimed is:

1. A process for the separation of sulfur dioxide from a gaseous stream which comprises contacting the gaseous stream with at least one molten inorganic thiocyanate absorbent which is unsaturated with respect to sulfur dioxide.

2. A process as claimed in claim 1 in which there is present in the molten inorganic thiocyanate a temperature stable solute which is reactive with respect to sulfur dioxide.

3. A process as claimed in claim 2 in which the solute is selected from the group consisting of bases, oxidizing agents and reducing agents.

4. A process as claimed in claim 3 in which the solute is present in an amount of from $10^{-3}$ to about $10^{-1}$ mols per mol of thiocyanate.

5. A process for the separation of sulfur dioxide from a gaseous stream which comprises contacting the gaseous stream with molten potassium thiocyanate, said molten potassium thiocyanate being unsaturated with respect to sulfur dioxide.

6. A process as claimed in claim 5 in which molten sodium thiocyanate is present.

7. A process as claimed in claim 6 in which the sodium thiocyanate is present in an amount up to about 30 mol percent based on the total mols of sodium thiocyanate and potassium thiocyanate.

8. A process as claimed in claim 5 in which there is present a temperature stable solute which is reactive with respect to sulfur dioxide.

9. A process as claimed in claim 8 in which the solute is selected from the group consisting of inorganic bases, oxidizing agents and reducing agents.

10. A process as claimed in claim 8 in which the solute is selected from the group selected from alkali sulfites, alkali carbonates and quinones.

11. A process as claimed in claim 5 in which there is present a reactive solute selected from the group consisting of potassium sulfite and potassium carbonate.

12. A process as claimed in claim 6 in which there is present a temperature stable solute which is reactive with respect to sulfur dioxide.

13. A process as claimed in claim 7 in which there is present a temperature stable solute which is reactive with respect to sulfur dioxide.

14. A process as claimed in claim 12 in which the solute is selected from the group consisting of inorganic bases, oxidizing agents and reducing agents.

15. A process as claimed in claim 12 in which the solute is selected from the group selected from alkali sulfites, alkali carbonates and quinones.

16. A process as claimed in claim 13 in which the solute is selected from the group selected from alkali sulfites, alkali carbonates and quinones.

17. A process as claimed in claim 5 in which there is present at least one solute selected from the group consisting of potassium sulfite, potassium carbonate, sodium sulfite and sodium carbonate.

References Cited

UNITED STATES PATENTS

| | | | |
|---|---|---|---|
| 3,438,722 | 4/1969 | Heredy et al. | 23—2 |
| 3,552,912 | 1/1971 | Bartholomew | 23—2 |

OTHER REFERENCES

Ubblohde, A. R.: "Chemistry and Industry," London, March 1968.

GEORGE O. PETERS, Primary Examiner

U.S. Cl. X.R.

55—73; 423—242